MAGNETIC STORAGE TABULATOR

Filed Jan. 3, 1961 2 Sheets-Sheet 1

INVENTORS
JOSEPH M. BERNSTEIN
HILARY M. WINTERS
BY
ATTY.

MAGNETIC STORAGE TABULATOR

Filed Jan. 3, 1961 2 Sheets-Sheet 2

INVENTORS
JOSEPH M. BERNSTEIN
HILARY M. WINTERS
BY C. A. Gulbrandsen
ATTY.

United States Patent Office 3,121,140
Patented Feb. 11, 1964

3,121,140

MAGNETIC STORAGE TABULATOR

Joseph M. Bernstein, Bensenville, and Hilary M. Winters, Chicago, Ill., assignors to Automatic Electric Laboratories, Inc., Northlake, Ill., a corporation of Delaware Filed Jan. 3, 1961, Ser. No. 80,450
12 Claims. (Cl. 179—7.1)

Figure 1:
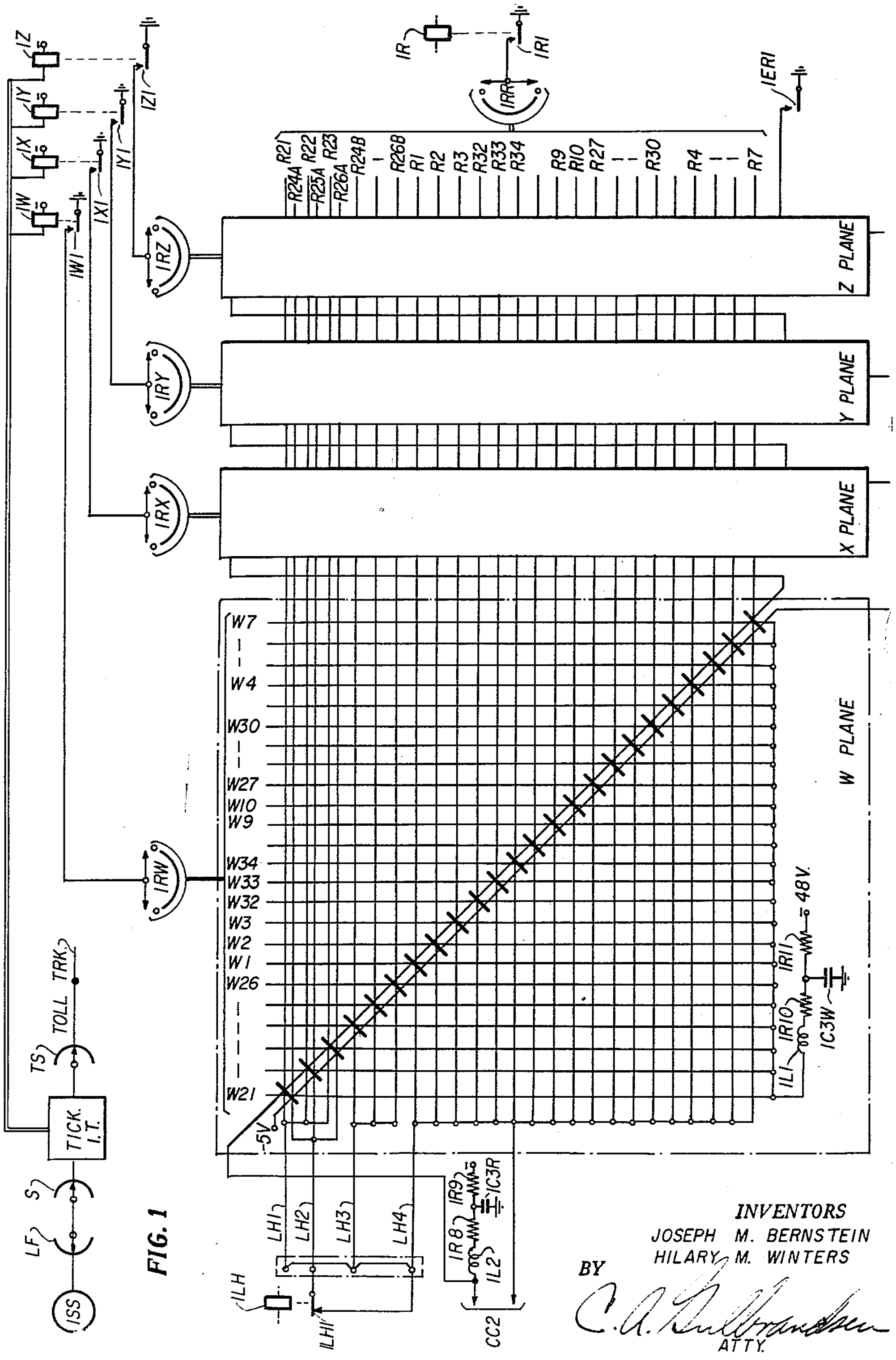

The present invention relates to automatic telephone systems and more particularly to automatic recording apparatus operative to record given particulars relative to certain calls in the system. More particularly, the present invention relates to improvements in telephone systems of the character disclosed in the J. E. Ostline, S. W. Benson and M. H. Esperseth Patent No. 2,955,163, granted October 4, 1960.

In a telephone system serving a large area, the area is usually divided into a plurality of zones and calls between the exchanges in different zones and between certain of the exchanges in the same zones are processed as toll calls, for which charges are made, depending upon the distance between zones or the distances between the exchanges in the same zone, and the time duration of the call.

In an automatic toll ticketing system of the type disclosed in the above mentioned patent, the area served by the telephone system is divided into a plurality of zones and each zone includes one or more telephone exchanges. Telephone connections established between the subscribers in the different exchanges in the different zones and between the subscribers in different exchanges in the same zone are handled on a toll basis so that the charges for the connections may be assessed against the calling subscriber substations in accordance with the distance between the originating and terminating exchanges and the time duration of the completed telephone connection. Each telephone connection is established automatically under control of a calling subscriber dial and a record is produced of the particulars concerning the connections, including the office code digits identifying both the calling and the called exchanges, the numerical digits identifying both the calling and the called subscriber substations, and other pertinent particulars, such as the rate of charge applicable to the connection, the duration thereof, the date, and possibly the total toll charge for the connection.

In the automatic toll ticketing telephone system of the type disclosed, the operation is started with the subscriber dialing a toll access code to access the toll ticketing equipment. After which an idle ticketer is associated with the calling line. The calling station's directory number is detected and recorded in the ticketer. Then the dialing of the called zone and called exchange digits, of a call to a toll zone, a transender in the exchange will register these dialed digits and will then cause an idle translator to be associated with the transender. The remaining digits of the called subscriber number, dialed by the calling subscriber, will be registered in the ticketer. The transender will then transmit switch setting impulses corresponding either to the value of the digits registered therein or to a translation of a certain portion of the registered digits, followed by impulses corresponding to the value of the remaining registered digits depending upon the routing path over which the connection is to be completed to the called exchange.

During the connection to the called subscriber line, the ticketer will remain in the circuit for the purpose of registering and storing various items of record information which are temporarily registered therein. The information registered therein includes the calling subscriber number, the called office code digits and the called subscriber number, involved in the connection. The ticketer will also time the call and in response to the release of the connection, the ticketer will have registered therein the above-mentioned items of information plus the duration of the call. Following the release of the connection, the ticketer will cause a tabulator to be associated therewith and it will transfer all of the items of information as noted above, including the identity of the ticketer to the tabulator. The ticketer may be of the type disclosed in the copending application of J. E. Ostline and J. W. Taugner, Serial No. 650,508 filed April 3, 1957, now Patent No. 3,046,342. This disclosure is incorporated herein by reference. The tabulator will control a tape perforator to produce a record of the completed call. The tape perforator may conveniently be of the type disclosed in the J. E. Ostline Patent No. 2,794,070, issued May 28, 1957. The disclosure of this patent is incorporated herein by reference as part of the present specification. On the perforated tape will be recorded the month, day, hour and minute of the time of termination of the call, the complete directory number of the calling line and the called line, the time duration of the call, and the rate applicable to the call.

The tabulators in use at present utilize groups of relays termed "codels" for the temporary storage of the information. The information stored in the codel relays is destroyed after the information is transferred to a paper tape by the perforator. The storage units or codel relays have a comparatively high power consumption rate, since current must flow through the relay coils to keep them energized. The space occupied by a tabulator using relay storage is also substantial.

Accordingly, it is the main object of the present invention to provide a tabulator for use with automatic toll ticketing telephone systems, which is economical to manufacture and install, and which provides the necessary facilities for producing a complete record of each toll connection.

It is still another object of the present invention to provide a tabulator using solid state devices with only a minimum of electromechanical devices.

A feature of the instant invention shall be the use of magnetic cores as storage devices.

Further objects and features of the invention pertain to the particular arrangement of the circuit elements and the apparatus whereby the above outlined objects and additional operating features are obtained.

Figures 2, 3:
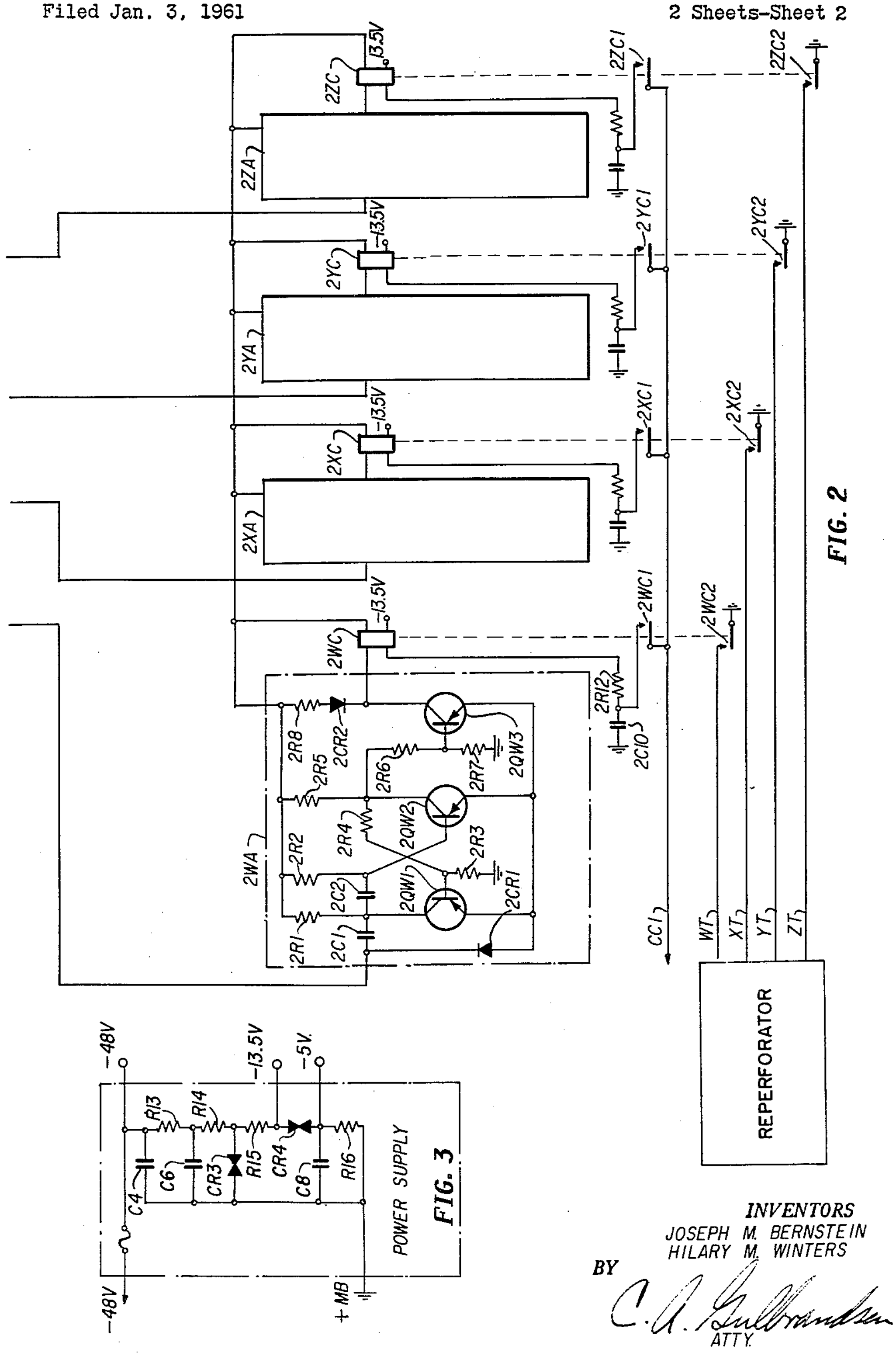

The invention both as to its organization and method of operation, together with further objects and advantages thereof, will best be understood by reference to the following specification taken in connnection with the accompanying drawings in which FIGS. 1 and 2 illustrate the necessary details of the invention and when placed one above the other illustrate the apparatus incorporating the features briefly outlined above while FIGURE 3 illustrates a power supply for the apparatus. Generally described, at the completion of the toll call, the ticketer assigned to receive and store information pertinent to the call seizes an idle tabulator and "spills" this data into the tabulator. In the case of the subject tabulator, this data is written into the ferrite cores.

This data may include:

(a) Caller's number
(b) Area and number called
(c) Time and date
(d) Time at end of call
(e) Conversation duration
(f) Rate
(g) Ticketer's number
(h) Tabulator's number
(i) Toll charges The information is received thru a four-level rotary switch 1R. A wiper arm at each level of this rotary switch is connected to ground by a marking relay controlled by the ticketer and timed from the tabulator. The leads from the rotary switch are connected to the ferrite core memory write windings. There are four memory planes designated 1W, 1X, 1Y and 1Z, one plane being associated with each level of the rotary switch. One such memory plane W is shown in full. There are 24 cores in each plane, a total of 96 cores in all four planes. A write driver is associated with each memory plane, while a single read driver is common to all four planes. Each memory plane has a sense amplifier such as 2WA associated with it.

As the rotary switch is stepped sequentially thru its 24 positions, the cores may or may not have data switched in, depending on the presence or absence of a ground mark on the wiper arm. At the completion of the write cycle, the data is transferred, in a permuted sequence, to the tape perforating equipment.

Information read-out is accomplished identically to the method of writing. A single-level rotary switch is used to sequentially interrogate the 24 cores in each plane. Correspondingly located ones in the four planes are read-out simultaneously. A lead from a terminal on the read rotary switch threads thru the four cores in series to the read driver. There are 27 of these wires, the extra three wires being required for the special long haul-short haul functions. The 27 wires are interconnected by a long haul-short haul relay for proper storage arrangement of information.

By inclusion of an extra winding and an erase relay contacts 1ER only are shown, the storage of information by accidental means is precluded. The erase winding threads thru all 96 cores in series from the read driver to the erase relay. The erase relay operates just prior to the start of the write cycle, putting a momentary ground on the erase winding. Thus all the cores are read-out or erased, allowing the write cycle to start with a clean slate.

Data stored in the cores is used to operate a control relay which passes the information on to the data processing equipment.

DETAIL DESCRIPTION

In a typical toll ticketing system of the Strowger type such as earlier referred to, upon termination of a toll call, a tabulator assigner connects an available tabulator to the calling ticketer. The ticketer 1T upon being connected to the tabulator takes control of the tabulator whereby the transfer of information from the ticketer is under control of the ticketer. This control is exercised in this instance to step the write rotary switch 1R the banks only of which are shown, and also to close the write relay contacts by selectively closing circuits to these relays in conformance with the information being transferred.

*Information Write-in*

Information from the ticketer is received through a four level rotary switch of which only the four banks levels 1RW, 1RX, 1RY and 1RZ are shown. The wiper arm on each of these levels of the rotary switch is connected to ground by a marker relay 1W, 1X, 1Y, and 1Z controlled by the ticketer. The rotary switch is stepped in unison with a sending rotary switch in the ticketer at a rate determined by a timing relay in the tabulator which relay and apparatus is not shown. The leads from the rotary switch bank are connected to the ferrite core memory. The magnetic ferrite core is a type of binary element, that consists most commonly of a ceramic ferrite material in the form of a toroid. The essential feature of this core is that it exhibits a practically rectangular hysteresis loop. A magnetizing force of a positive nature applied to the core and then removed, will leave the core with a certain residual magnetic flux. If the magnetizing force is negative, the core will be left in another state of residual magnetic flux. These two conditions of residual flux constitute the two binary states of marked and zero. The core will remain in either of its two states without the consumption of power, until it is remagnetized to its other state. There are 96 cores and 96 wires to the core array from the write rotary switch banks 1RW, 1RX, 1RY and 1RZ, a different wire for each core. The ferrite core system consists of four identical planes with 24 cores mounted in each plane. Each plane is designated by the letters W, X, Y, and Z. FIG. 1 shows the complete W-plane, core array. The wires from each level of the write rotary switch constitute the write winding which after passing through the cores in a single turn winding are terminated at the common end in a write driver circuit. There are four of these write driver circuits, one for each memory plane and level of the rotary switch. Current flows from the write driver through the core selected by the position of the write rotary switch to ground through the contacts of the marking relay such as 1W. The rotary switch to which the banks 1RW, 1RX etc. belong allots the cores to be written into and the marking relays control the cores that will be switched. The marking relays are operated under control of the associated ticketer in conformance with the information stored therein in a one or two marking out of a four element code, commonly referred to as the codel code. The following table shows the codel code:

| Digit | Letters | Codel Code |
|---|---|---|
| 1 | | WX |
| 2 | ABC | WY |
| 3 | DEF | WZ |
| 4 | GHI | XY |
| 5 | JKL | XZ |
| 6 | MNO | YZ |
| 7 | PRS | W |
| 8 | TUV | X |
| 9 | WXY | Y |
| 0 | | Z |

*Core Write Drivers*

The system uses separate drivers for writing each plane and a separate driver to read-out the cores.

The write driver circuit is shown on FIG. 1 and consists of inductors 1L1, resistors 1R10, 1R11 and capacitor 1C3W. Capacitor 1C3W charges to —48 v. through resistor R11. When the relay contacts at 1W are closed capacitor 1C3 discharges through resistor 1R10, inductor 1L1 and the selected core of the associated plane. Inductance 1L1 is selected to give the R—L—C combination a pulse period of approximately five microseconds. Resistor 1R10, in conjunction with the other stray circuit resistances, provides damping just below the critical value.

The write pulse is of approximately five microsecond duration with an amplitude of approximately 600 milliamperes in this described embodiment.

*Information Read-Out*

The reading of information is accomplished identically to the method of writing. A single level rotary switch 1RR is used for selection as to which four cores are to be read. A wire from a terminal on the read rotary switch 1RR goes through four cores in series. There are 27 of these wires. The extra three wires are required for the special long-haul short-haul operation. To provide this function the wire after threading through the cores are terminated in four separate groups.

These groups are interconnected by a single short-haul long-haul relay 1LH controlled by the ticketer to provide for the proper storage arrangement of information. A single read driver connected to the core read windings via the short-haul long-haul relay contacts 1LH1 provides the current to switch and thereby read the cores. The read current path is again through the cores selected by the read rotary switch position and to ground via lead CC2 from the timing relay. The selected core, if it was in the proper state, will generate a voltage into its sense winding which will be amplified by the sense amplifier whose output drives the perforator control relay such as 2WC.

*Memory Planes*

READ WINDINGS

Wires with an "R" prefix constitute the read winding. These are also a one-turn winding with the common termination leading to the read driver. The read windings are threaded through the identically positioned cores in the other three memory planes. Thus, one read driver interrogates the four planes simultaneously.

The first three cores have two windings threaded through them. The common ends of these windings are routed through the contacts of the long-haul short-haul relay before terminating in the read driver.

*Sense Winding*

The sense winding consists of a two-turn winding which is connected to the sense amplifier associated with each level.

*Sense Amplifier*

The sense amplifier receives a positive 1.5 volt pulse of approximately four microseconds duration and delivers a 50 millisecond pulse which operates the control relay, 2WC for the W plane. The pulse duration is extended to 40 milliseconds by means of a mono-stable multivibrator driving a power amplifier.

Transistors 2QW1 and 2QW2 comprise the multivibrator circuit and transistor 2QW3 is required for the purpose of decoupling the multivibrator from any adverse effects of the control relay 2WC. This relay 2WC has a second winding which functions to "self-hold" the relay until the perforator has completed its cycle. This second winding, by transformer action, gives rise to a transient pulse in the collector circuit which would trigger the multivibrator if the relay were located in the multivibrator portion of the amplifier.

Resistor 2R8 and diode 2CR–2 function as a damping circuit to protect transistor 2QW3 from the large transient voltages resulting from the inductance of the control relay 2WC.

In the stable state transistors 2QW1 and 2QW3 are cut off by a bias applied to their bases through voltage divider circuits composed of resistors 2R3, 2R4, and 2QW2 (for 2QW1) and 2R7, 2R6, and 2QW2 (for 2QW3). The bias resulting is approximately one volt, transistor 2QW2 is in saturation at this time.

When the positive sense pulse is injected through capacitor 2C1, the base of transistor 2QW2 is driven positive and in the ensuing regenerative action of the multivibrator circuit inverts to the quasi-stable state. Simultaneously, the base of transistor 2QW3 is driven negatively and transistor 2QW3 goes into saturation, energizing the control relay 2WC. Control relay 2WC upon operating closes its contacts 2WC2 to extend ground potential to operate the "W" punch magnet of the reperforator. This same action occurs for the other three sense amplifiers and associated relays.

The circuit remains in this quasi-stable state until capacitor 2C2 has discharged through resistor 2R2 at which time the circuit reverts to its quiescent condition. Capacitor 2C2 and resistor 2R2 have been selected to have a time constant of approximately 40 milliseconds, hence this is also the period of the multivibrator inversion.

Diode 2CR1 functions to prevent spurious triggering of the multivibrator circuit when the cores are being "written-in." During the write cycle, a negative pulse appears on the sense winding. This pulse is in a direction such that the multivibrator is unaffected by its presence; however, the positive transient appearing at the trailing edge occasionally reaches sufficient amplitude to trigger the multivibrator. Diode 2CR1 prevents the negative pulse from reaching amplitudes which would produce this spurious triggering.

*Core Read Drivers*

The read driver consisting of capacitor 1C3R, inductor 1L2 and resistors 1R8 and 1R9 differs only in the value of the inductance and damping resistance used. These have been changed to 1.5 millihenries and 27 ohms in the embodiment shown to provide a slightly wider pulse of higher amplitude. The resulting current pulse is approximately seven microseconds long with an amplitude of approximately one ampere.

*Power Supply*

Power for the sense amplifier is derived from the 48 volt exchange battery. The voltage is reduced to 13.5 volts by means of series resistances R13, R14, R15 and R16 and regulated by two Zener diodes. The circuit is shown as FIGURE 3.

A cascaded system of regulation is employed with Zener diode CR–3 regulating at 24 v. at the first level and Zener diode CR–4 regulating at 8.5 v. at the final level. The series dropping resistors R13, R14, R15 and R16 are shunted with filter capacitors C4, C6 and C8 to minimize the effects of disturbances on the 48 v. supply.

What is claimed is:

1. In a toll ticketing telephone system, in which an exchange includes switching equipment, toll ticketers, perforators and a tabulator adapted to accept the ticketing information from said ticketer as a one or two marking in a four place code and control a perforator to make a permanent record thereof;

said tabulator including an allotting device operated by said ticketer, four groups of storage apparatus comprising cores of magnetic material which has a substantially rectangular hysteresis characteristic, a first winding on each of said cores, a first terminal of said first winding connected to said allotting device, a driving circuit, a second terminal of said first windings in each group of storage apparatus connected to said driving circuit, a second winding through all of said cores in series, means operated for selectively passing a current through said second winding upon association of said ticketer with said tabulator to switch said cores from a first to a second state of magnetization, code relay means operated by said ticketer to selectively switch said cores in accord with the code information from said ticketer from said second to said first state, a third winding through corresponding ones of said cores in each group, second allotting means, timing means, a first terminal of each of said third windings connected to said second allotting means, second driving means, the second terminal of each of said third windings connected to said second driving means via said timing means, fourth windings through the cores of each group, sensing means, said fourth windings connected to said sensing means, said timing means operated to sequentially step said second allotting means to connect said cores in series with said second driving means to switch any of said cores from said first to said second state, said sensing means operated in response to the change of state of the corresponding cores to operate said perforator to record said coded information.

2. A tabulator as claimed in claim 1 wherein said sensing means includes a mono-stable multivibrator means operated to extend read-out pulses from said cores to a sufficient duration to operate a relay.

3. A tabulator as claimed in claim 2 wherein said multivibrator includes a diode at the input operated to prevent spurious triggering of said multivibrator.

4. A tabulator as claimed in claim 2 wherein said sensing means includes a mark relay operated by said multivibrator to complete the associated circuits to said perforator.

5. A tabulator as claimed in claim 4 wherein said sensing means includes a transistor amplifier between said multivibrator and said mark relay to isolate said multivibrator from said relay.

6. A tabulator as claimed in claim 5 wherein said amplifiers include a diode so polarized across the collector and base of said transistor amplifier operated upon release of said relay to prevent triggering of said multivibrator.

7. A tabulator as claimed in claim 4 wherein said relays include a second winding to self-lock said relays to a pulse from said timing means.

8. In a toll ticketing telephone system, in which an exchange includes switching equipment, toll ticketers, perforators and a tabulator adapted to accept the ticketing information from said ticketer as a one or two marking in a four place code and control a perforator to make a permanent record thereof;

said tabulator including a rotary switch having four sets of bank contacts operated by said ticketer, four groups of 24 cores of magnetic material which has a substantially rectangular hysteresis characteristic, a first winding on each of said cores, a first terminal of said first winding connected to corresponding rotary switch bank contacts, four driving circuits, a second terminal of said first windings in each group of cores connected to an individual driving circuit, a second winding through all of said cores in series, means operated for selectively passing a current through said second winding upon association of said ticketer with said tabulator to switch said cores from a first to a second state of magnetization, code relay means operated by said ticketer to selectively switch said cores allotted by said rotary switch bank contacts and said associated driving apparatus to switch said selected cores in accord with the code information from said ticketer from said second to said first state, a third winding through corresponding ones of said cores in each group, a second rotary switch with a single set of bank contacts, timing means, a first terminal of each of said third windings connected to said second rotary switch bank contacts, second driving means, the second terminal of each of said third windings connected to said second driving means via said timing means, fourth windings through all of the cores of each individual group, four sensing means, said fourth windings each connected to individual ones of said sensing means, said timing means operated to sequentially step said second rotary switch to connect said cores in series with said second driving means to switch any marked ones of said cores from said first to said second state, said sensing means operated in response to the change of state of the corresponding cores to operate said perforator to record said coded information.

9. A tabulator as claimed in claim 8 wherein each said sensing means includes a mark relay, a transistor amplifier and a mono-stable multivibrator, said multivibrator operated to stretch read-out pulses from said cores, said amplifier operated to amplify said stretched pulses to operate said mark relay whereby said mark relay completes a circuit to said perforator.

10. A tabulator as claimed in claim 9 wherein said multivibrator input is shunted by a diode and capacitor between the collector and emitter whereby spurious pulses are absorbed.

11. A tabulator as claimed in claim 10 wherein said mark relays include a second winding and a pair of make contacts connected to said timing pulse source whereby said relays self-lock for the duration of the pulse from said timing means.

12. In a tabulator as claimed in claim 8 a third relay including a set of break contacts operated by said ticketer for a ten digit call member, a fifth winding paralleling said third winding through the first three of said cores in each group said fifth winding connected to said second driving means via said break contacts whereby said cores are read in an altered sequence.

References Cited in the file of this patent

UNITED STATES PATENTS

| | | |
|---|---|---|
| 2,947,817 | Harris | Aug. 2, 1960 |
| 3,015,699 | Faulkner et al. | Jan. 2, 1962 |